United States Patent [19]

Aoyama et al.

[11] 4,033,128
[45] July 5, 1977

[54] CONTROLS FOR A HYDRAULICALLY DRIVEN VEHICLE

[75] Inventors: Ryozo Aoyama; Yukinobu Matsuda; Mitsuo Urushima, all of Hirakata, Japan

[73] Assignee: Kabushiki Kaisha Komatsu Seisakusho, Tokyo, Japan

[22] Filed: Oct. 8, 1975

[21] Appl. No.: 620,816

[30] Foreign Application Priority Data

Oct. 8, 1974 Japan .................. 49-120931[U]

[52] U.S. Cl. .................. 60/484; 91/414; 180/6.48
[51] Int. Cl.[2] .................. F15B 11/16
[58] Field of Search .......... 60/395, 484, 905; 91/411 R, 414, 462; 180/6.48

[56] References Cited
UNITED STATES PATENTS

| | | | |
|---|---|---|---|
| 3,672,161 | 6/1972 | Krusche et al. | 180/6.48 X |
| 3,774,707 | 11/1973 | Bridwell et al. | 180/6.48 X |
| 3,917,014 | 11/1975 | Ward | 60/484 X |

*Primary Examiner*—Edgar W. Geoghegan
*Attorney, Agent, or Firm*—Armstrong, Nikaido & Marmelstein

[57] ABSTRACT

Controls for a hydraulically driven vehicle, so designed as to actuate a pilot change-over valve for directional control of travel for proper change-over by means of a lever for directional control of travel, to cause the hydraulic pressure fed by a hydraulic pressure source for a pilot to operate a valve for directional control of travel, and to actuate the valve for directional control of travel for proper change-over, whereby to cause a pair of motors for directional control of travel, arranged on the right and on the left of the vehicle, to either revolve in a forward or reverse direction, thus causing the vehicle to be put in forward movement or rearward movement, respectively where the controls for a hydraulically driven vehicle are so designed as to actuate a lever for directional control concurrently, thus enabling the vehicle to be put in either a right revolution or a left revolution.

4 Claims, 6 Drawing Figures

FORWARD
(STRAIGHT)

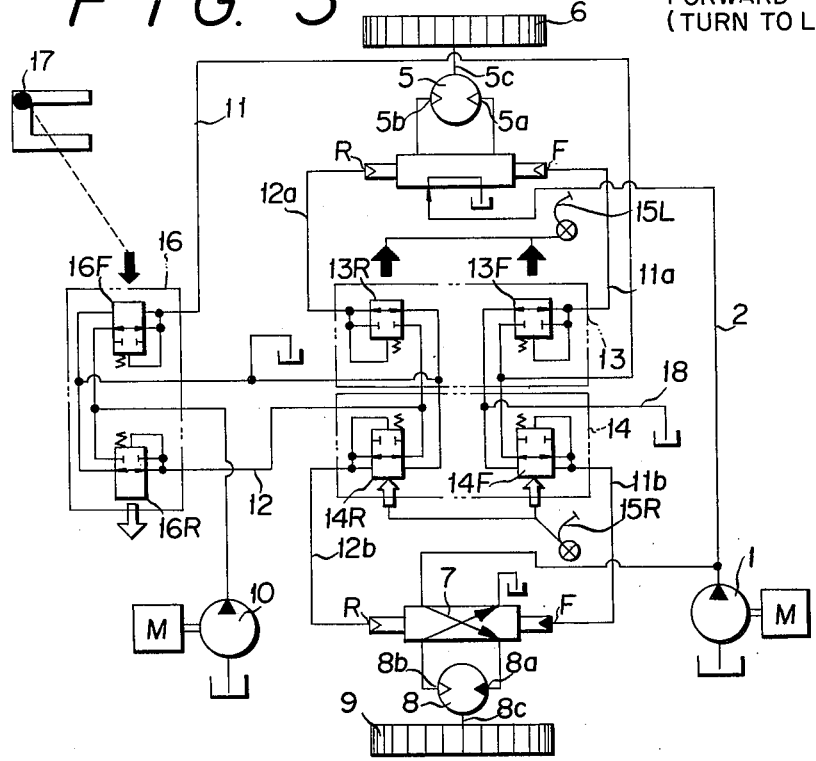
FIG. 3  FORWARD (TURN TO LEFT)
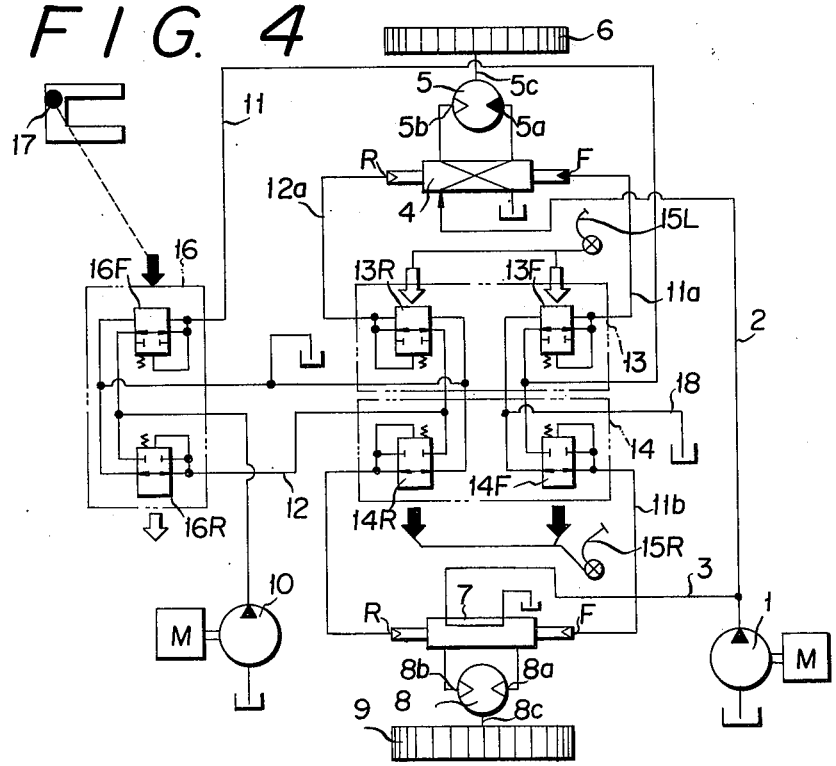
FIG. 4

STOP

REVERSE

CONTROLS FOR A HYDRAULICALLY DRIVEN VEHICLE

BACKGROUND OF THE INVENTION

The present invention relates to controls for a hydraulically driven vehicle such as a hydraulic pressure type power shovel or the like, wherein the direction of travel is subjected to control by a pair of hydraulic motors arranged in place on the right and on the left sides thereof, respectively.

In conventional practice, controls of this category have usually comprised a pair of independent control levers arranged on the right and on the left and which are connected with a pair of control sections of a hydraulic motor for driving the right and left drive wheels, respectively.

However, in the case of conventional technology of this category, operational control is complicated due mainly to the dual system of control levers; therefore, special skill has been required for the proper operation of such a vehicle.

One object of the present invention rests in providing controls for a hydraulically driven vehicle which are completely capable of eliminating the said operational defects inherent in conventional technology as described heretofore.

Another object of the present invention rests in providing controls for a hydraulically driven vehicle which are completely capable of causing the vehicle to engage in forward movement, rearward movement, a right revolution, and a left revolution. All of this is achieved by the proper actuation of a lever for forward or rearward directional travel and a pair of pedals for additional directional control in a right or left revolution where the pedals are mounted in place on the right and left sides, respectively.

Still other objects of the present invention rest with providing controls for a hydraulically driven vehicle, wherein the lever for forward or rearward directional travel and the pair of pedals for additional directional control mounted in place on the right and left sides respectively, are not in the state of being engaged with each other in mechanical terms but comprise independent operating mechanisms, respectively.

In the present invention, a vehicle can be caused to engage to forward movement and rearward movement, by the proper operation of a lever for that control of travel in a manner effectuating a change-over to that end.

In case either one of the said pair of pedals for right or left directional control is put into operation, while a vehicle still remains in a state of forward movement or rearward movement, a pilot change-over valve for directional control arranged on the side of the respective pedal thus actuated is set at a position for drainage, and the valve for travel (motor control valve) on the side of the pedal thus actuated is set in a neutral position.

Therefore, in the situation where both the lever for forward or rearward directional control of travel and either of the pair of pedals for additional directional control are actuated at the same time, the vehicle is thereby put into a right or left revolution respectively and concurrently.

Since the lever for forward or rearward directional control of travel and the pedals for additional directional control are not engaged with each other in mechanical terms, the operating mechanism for the lever for forward or rearward travel and that for the pedals for right or left directional control can be simplified, respectively, in terms of the constitution thereof; therefore, even in a situation where the lever for forward or rearward travel is changed over for operation in a state wherein the pedals for directional control are actuated, the operating potential thereof is properly kept free from gaining force.

Besides, now that the pilot change-over valve for directional control, wherein the operating potential grows larger than that of the pilot change-over valve, is so designed as to be of the pedal operation system type, the operational properties thereof can be improved in a favorable manner.

Other objects, features and advantages of the present invention will be readily rendered apparent through the following description given in conjunction with the accompanying drawings, wherein FIG. 1 is an explanatory drawing of the diagrammatical consitution of the controls for a hydraulically driven vehicle introduced in the present invention, and FIG. 2 through FIG. 6 are explanatory drawings of the actuation thereof.

DESCRIPTION OF THE DRAWINGS

FIG. 3 illustrates the hydraulic circuit when actuation for forward directional control and leftward directional control occur at the same time.

FIG. 4 illustrates the hydraulic circuit when actuated for forward and rightward directional control.

Figure 1:
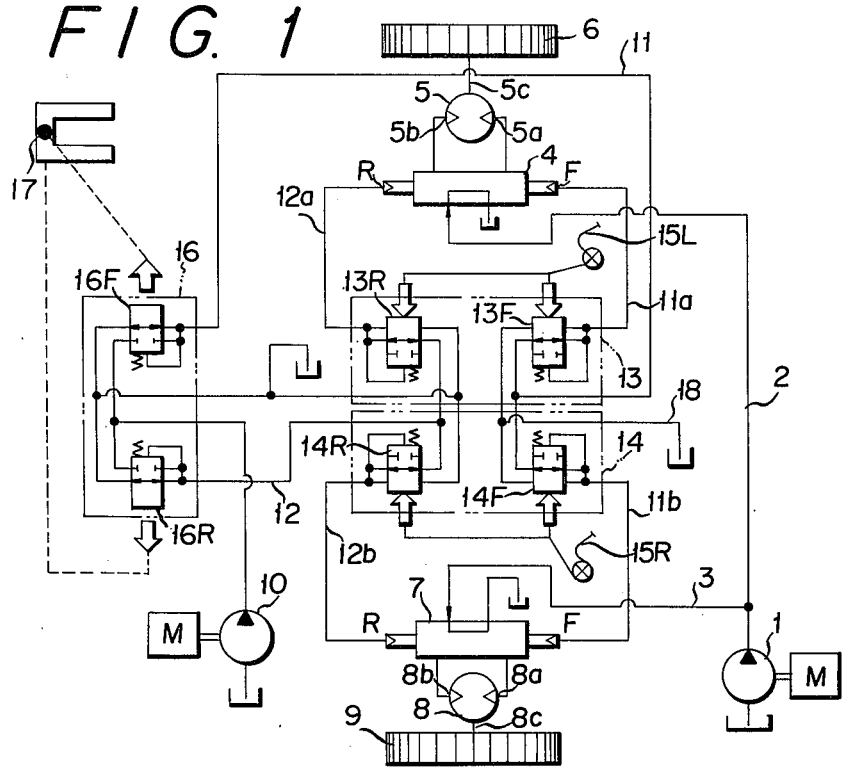
FIG. 1 illustrates the hydraulic circuit in an unactuated state.

A description of an illustration of the present invention will be given below, by making reference to the accompanying drawings, FIGS. 1 through 6 of which are hydraulic circuit diagrams illustrating the various aspects of the invention.

DETAILED DESCRIPTION OF THE INVENTION

The fluid discharged by a pump 1 for travel is branched in a manner so as to flow through the primary pipeline 2 and the secondary pipeline 3. The primary pipeline 2 has a feed rate properly controlled through the forward flow port 5a and the reverse flow port 5b of the motor 5 for travel on the left side, as it flows through a pilot-actuated traveling valve 4 on the left side, to thus drive the output shaft 5c of the motor 5 for travel arranged on the left side in a manner to put the same into forward revolution or reverse revolution, and to cause the endless track 6 on the left side to be driven by the said output shaft 5c. The secondary pipeline 3, on a portion thereof, has feed properly controlled at the forward flow port 8a and the reverse flow port 8b of the motor 8 for travel arranged on the right side, as it flows through the pilot-actuated travelling valve 7 on the right side, to thus drive the output shaft 8c of the motor for travel on the right side in a manner to put the same into forward revolution or reverse revolution, and to cause the endless track 9 on the right side to be driven by the said output shaft 8c.

Numeral 10 is a pump for the pilot circuit. The fluid discharged by the pump 10 is properly branched in a manner so as to flow through a first pilot pipeline 11 on the left side and is further branched into the primary pilot pipeline 11a and the secondary pilot pipeline 11b. Both the primary and secondary pilot pipelines have continuous flow therethrough to actuating means for the pilot-actuated traveling valves 7 and 4 on the right and left sides, respectively for forward movement F. A second pilot pipeline 12 is arranged on the right side and is further branched into primary pilot pipeline 12a and secondary pilot pipeline 12b. Both of the latter the primary and secondary pilot pipelines have continuous flow therethrough from actuating means for the pilot-actuated traveling valves 7 and 4 on the right and left sides, respectively for rearward movement R.

Numeral 13 is a first pilot change-over valve for directional control arranged on the left side, which is provided with element 13F for forward movement and element 13R for rearward movement. Numeral 14 is a second pilot change-over valve for directional control arranged on the right side, which is provided with element 14F for forward movement and element 14R for rear movement. Each of the pilot change-over valves 13 and 14 for forward or rearward directional control is retained in an energized state at a position adapted for continuous flow therethrough at normal times. Furthermore, each of the pilot change-over valves 13 and 14 for forward or rearward directional control is actuated by a pair of pedals 15R, 15L for directional control at the respective location on the right and left sides, to thus constitute a position adapted for drainage. Numeral 16 identifies a third pilot change-over valve for travel, which is provided with a pilot change-over valve for forward moving travel, 16F, and a pilot change-over valve for rear moving travel, 16R. The pilot change-over valve for forward moving travel, 16F, is retained in an energized state at a position adapted for drainage at normal times. The pilot change-over valve for rearward moving travel, 16R, is properly retained in a state of being energized in a position adapted for drainage at normal times. Furthermore, each of the pilot change-over valves 16F, 16R is actuated from the position adapted for continuous flow therethrough, respectively, by means of a lever 17 for travel. In the drawings, M represents a motor for driving the pump 1 or 10.

Next, a description of the actuation of the controls will be given below.

Figure 2:
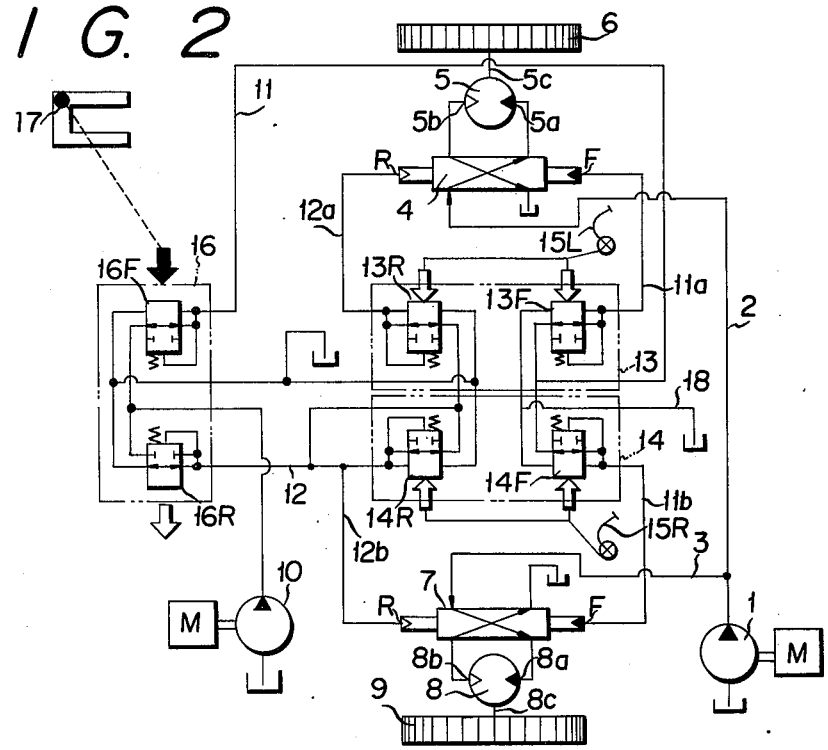
FIG. 2 illustrates the hydraulic circuit actuated for straight (forward) directional control.

When the lever 17 is acutated, as shown in FIG. 2, in a manner so as to be set in position for forward movement F, the pilot change-over valve for forward travel to the left, 16F, is set in a position for continuous flow therethrough, and the pilot fluid is thereby caused to flow in the pilot pipeline 11 on the left. Now each of the pilot change-over valves for directional control 13F, 13R, 14F and 14R is retained in a state of energization in a position adapted for continuous flow therethrough, since the fluid discharged by the pump 10 for the pilot fluid, flows to the side of forward movement F of the right and left valves for travel 7 and 4 which are subjected to a change-over in a manner so as to be set in a position for forward movement, as shown in FIG. 2. Then the fluid discharged by the pump 1 for travel is thus caused to be fed to the ports 5a and 8a for forward revolution of the motors 5 and 8 for travel arranged on the left and on the right, respectively. Therefore, the motors 5 and 8 for travel, arranged on the left and on the right, are driven to produce forward revolution, respectively, and the endless tracks 6 and 9 on the left and right sides, respectively, are driven in a predetermined manner, thus causing the vehicle to move forward. (FIG. 2)

When the pedal 15L arranged on the left side for leftward directional control is actuated from the above-mentioned state as shown in FIG. 2, and the first pilot change-over valve 13 for forward leftward directional control is set in a position adapted for drainage, as shown in FIG. 3, the primary pilot pipeline 11a on the left side is caused to have continuous flow therethrough with a drain pipeline 18. Therefore, the flow of the pilot fluid to the side of forward movement F of the pilot-actuated traveling valve 4 arranged on the left side is suspended, and the pilot-actuated traveling valve 4 is thus set in a neutral position in a proper manner, whereby the motor 5, for travel, arranged on the left side has the actuation thereof suspended. When the motor 5 for travel arranged on the left side thus has the actuation thereof suspended, the vehicle is caused to travel in a leftward revolution (FIG. 3).

When the pedal 15R, arranged on the right side for rightward directional control, is actuated from the state shown in FIG. 2, and the second pilot change-over valve 14 for rightward directional control is set at a position for drainage, as shown in FIG. 4, the secondary pilot pipeline 11b on the right side is caused to have continuous flow therethrough with the drain pipeline 18, and the flow of the pilot fluid to the side of forward movement F of the pilot-actuated traveling valve 7 on the right side is suspended, and the pilot-actuated traveling 7 is thus set at a neutral position in a proper manner, whereby the motor 8 for travel arranged on the right side has the actuation thereof suspended, and the vehicle is caused to be revolved in a forward rightward direction. (FIG. 4)

Figure 5:
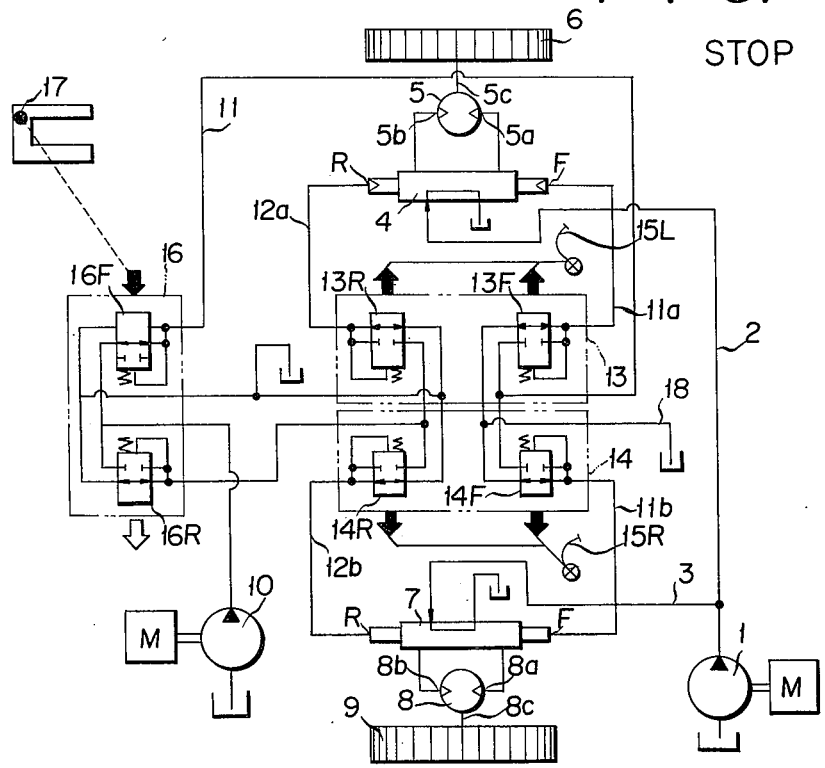
FIG. 5 illustrates the hydraulic circuit in a stopped condition.

When the pedal 15L arranged on the left side for leftward directional control and the pedal 15R arranged on the right side for rightward directional control are actuated at the same time from the state shown in FIG. 2 to that shown in FIG. 5, the pilot change-over valve 13 for leftward directional control and the pilot change-over valve 14 for rightward directional control are set in a position adapted for drainage, respectively, whereby the primary pilot pipeline 11a on the left side and the secondary pilot pipeline 11b arranged likewise on the right side have continuous flow therethrough with the drain pipeline 18. Therefore, the valve 4 arranged on the left and the valve 7 arranged on the right are thus set forth in operation as in the preceding paragraphs, and the vehicle has the actuation thereof suspended. (FIG. 5)

Figure 6:
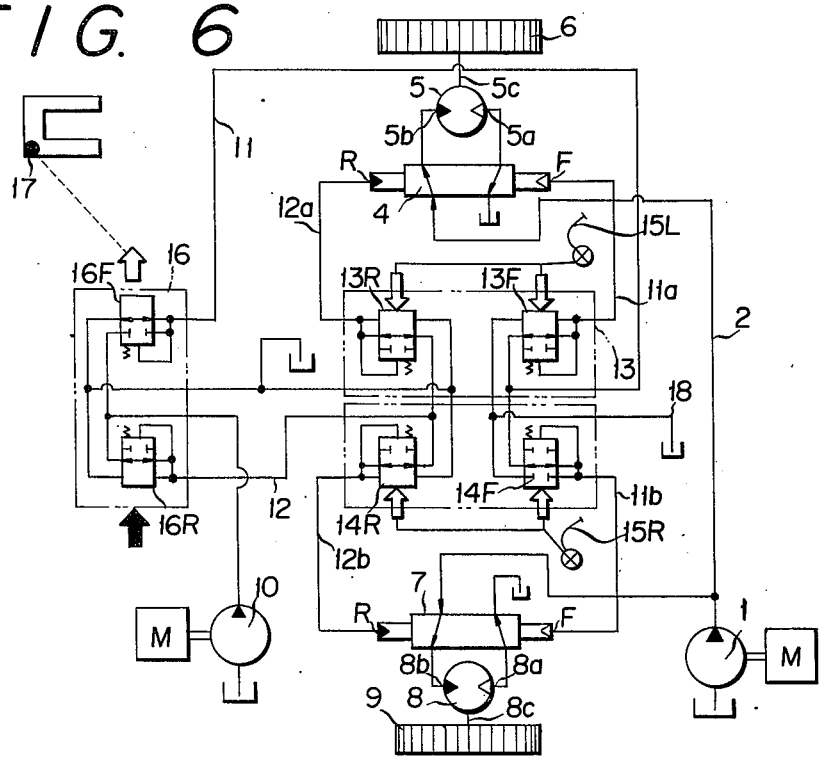
FIG. 6 illustrates the hydraulic circuit when the lever for travel is set in a position for reverse movement.

Furthermore, when the lever 17 for travel is set in a position for rearward movement R, as shown in FIG. 6, the pilot change-over valve 16R for rearward travel is set in a position for continuous flow from pump 10 therethrough to pilot line 12, the valve 4 for leftward travel and the valve 7 for rightward travel are pressurized at R for rearward movement of the vehicle in the same manner as is set forth in the preceding paragraphs for forward vehicle movement, and the left and right motors 5 and 8 for travel are reversed, whereby the vehicle is caused to move in a rearward direction. (FIG. 6)

What is claimed is:

1. Controls for a hydraulically driven vehicle, comprising:
   a. a first hydraulic pressure source,
   b. a first valve means connected in a continuous manner with said first hydraulic pressure source, c. a pair of motors connected in a continuous manner with said first valve means, d. a second hydraulic pressure source for a pilot circuit, e. a second valve means for actuating said first valve means whereof one port thereof is connected in a continuous manner with said second hydraulic pressure source, and another port is connected in a continuous manner with an operating means for said first valve means, with said second valve means being connected to a tank, f. first means for actuating said second valve means, g. a third valve means for controlling right and left revolutions of the vehicle, said third valve means being disposed in a pilot operated circuit and held in a connected position, and h. a second means for actuating the third valve means.

2. The controls for a hydraulically driven vehicle, set forth in claim 1, wherein said first means is a lever and said second means is a pair of pedals.

3. The controls for a hydraulically driven vehicle, set forth in claim 2, wherein said primary valve means is a pilot actuated valve, said secondary valve means is a pilot operated change-over valve, and said third valve means is a pilot operated change-over valve for directional control of the vehicle.

4. The controls for a hydraulically driven vehicle, set forth in claim 3, wherein the hydraulic pressure fed by said first hydraulic pressure source is fed to a port for normal revolution of another port for reverse revolution of said motors.

* * * * *